(12) United States Patent
Gorman

(10) Patent No.: US 6,904,537 B1
(45) Date of Patent: Jun. 7, 2005

(54) DATA TRANSMISSION ACROSS ASYNCHRONOUS TIME DOMAINS USING PHASE-SHIFTED DATA PACKET

(75) Inventor: J. Zachary Gorman, Beaverton, OR (US)

(73) Assignee: Network Elements, Inc., Beaverton, OR (US)

( * ) Notice: Subject to any disclaimer, the term of this patent is extended or adjusted under 35 U.S.C. 154(b) by 646 days.

(21) Appl. No.: 09/940,315

(22) Filed: Aug. 27, 2001

(51) Int. Cl.[7] .............................. G06F 1/12; G06F 1/04; H04L 7/00
(52) U.S. Cl. ................. 713/401; 713/600; 375/354
(58) Field of Search .................. 713/600, 400, 713/401; 375/354

(56) References Cited

U.S. PATENT DOCUMENTS

| | | | | |
|---|---|---|---|---|
| 5,022,057 A | * | 6/1991 | Nishi et al. | 375/373 |
| 5,487,092 A | * | 1/1996 | Finney et al. | 375/354 |
| 5,872,959 A | * | 2/1999 | Nguyen et al. | 713/401 |
| 6,087,867 A | * | 7/2000 | Holm | 327/144 |
| 6,275,547 B1 | * | 8/2001 | Saeki | 375/354 |
| 6,359,479 B1 | * | 3/2002 | Oprescu | 327/141 |
| 6,516,420 B1 | * | 2/2003 | Audityan et al. | 713/400 |
| 6,526,106 B1 | * | 2/2003 | Migita | 375/354 |
| 6,529,570 B1 | * | 3/2003 | Miller et al. | 375/354 |
| 6,744,833 B1 | * | 6/2004 | Kirkpatrick | 375/354 |

* cited by examiner

*Primary Examiner*—Chun Cao
(74) *Attorney, Agent, or Firm*—Schwabe, Williamson & Wyatt, P.C.

(57) ABSTRACT

A method and apparatus is provided for transmitting multi-bit data across asynchronous time domains. In one embodiment, the apparatus includes a first delay circuit to generate a selector signal based upon an input reference signal of a first time domain, a second delay circuit to generate a delayed data signal based upon an input data signal, and selection logic coupled to the first and second delay circuits to select one of the data signal and the delayed data signal based upon the state of the selector signal in accordance with an input clock signal of a second time domain, such that at any given sampling point of the input clock signal, the selector signal indicates valid data.

27 Claims, 7 Drawing Sheets

DATA TRANSMISSION ACROSS ASYNCHRONOUS TIME DOMAINS USING PHASE-SHIFTED DATA PACKET

BACKGROUND OF THE INVENTION

1. Field of the Invention

The present invention generally relates to the field of electronic circuits. More specifically, the present invention relates to a method and apparatus for passing data across an asynchronous clock boundary.

2. Background Information

With advances in integrated circuit, microprocessor, networking and communication technologies, an increasing number of devices, in particular, digital computing devices, are being networked together. Such devices are often first coupled to a local area network, such as an Ethernet based office/home network. In turn, the local area networks are interconnected together through wide area networks, such as ATM networks, Frame Relays, and the TCP/IP based global inter-networks, Internet. In transitioning from one network to another, data typically flows through one or more devices functioning e.g. as a network bridge or router. During the transition between such devices, and even between components within a single device, data will often be driven by multiple asynchronous clock signals regulating the respective traffic flows.

Depending upon how the clocks vary with respect to one another, there is the risk that invalid data may be passed from one time domain to the next. More specifically, there may be a point in time when the second clock samples data as it is transitioning in accordance with the transition of the first clock. If two asynchronous clocks are operating at the same frequency but vary in phase, it is possible to align the clocks to be synchronous by adjusting the phase of one or both clocks. If, however, two asynchronous clocks are operating at different frequencies, the respective clock edges may drift relative to each other in non-integer multiples resulting in unpredictable and perhaps invalid data.

Figure 1:
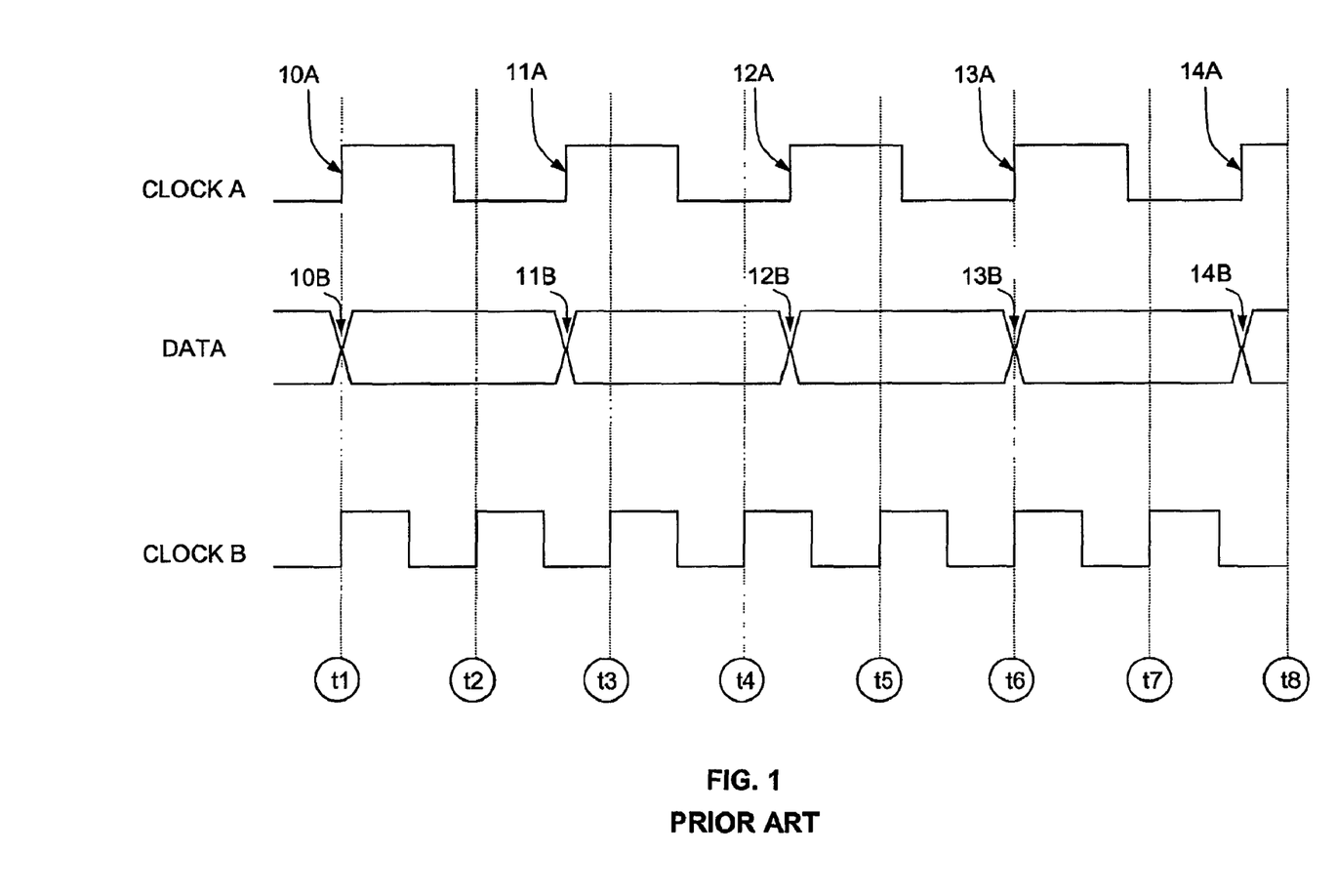
FIG. 1 is a timing diagram generated in accordance with the prior art illustrating the relationship between two asynchronous clock signals and a data signal to be passed from the first time domain to the second.

FIG. 1 is a timing diagram generated in accordance with the prior art illustrating the relationship between two asynchronous clock signals and a data signal to be passed from the first time domain to the second. As shown in FIG. 1, the data transitions at points (10b–10b) corresponding to the rising edges (10a–14a) of CLOCK A. Between each of these transition points the data is considered to be stable and valid. Clock B represents a clock signal from a second time domain operating asynchronously to CLOCK A. Each rising edge of clock signal B defines one of the eight time intervals indicated by dotted lines in FIG. 1. That is, each of the time intervals corresponds to one period of CLOCK B. If the data were to be sampled at clock interval t2, the data would be deemed stable resulting in valid data being returned. However, if the data were sampled at time intervals t1 and/or t6, the data would be deemed unpredictable since the respective time intervals correspond to transition points of the data (e.g. 10b and 13b).

Although asynchronous buffers (e.g. FIFO) with separate read and write clocks have traditionally been utilized to transfer multi-bit data from one time domain to another, it is difficult to design a circuit to accurately handle multi-bit data transfers/transitions commonplace in today's high-speed networks and computing devices without such buffers. Therefore, a novel technique to pass data between time domains while overcoming the limitations of the prior art is desired.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention. Further, the description repeatedly uses the phrase "in one embodiment", which ordinarily does not refer to the same embodiment, although it may.

Overview

Figure 2:
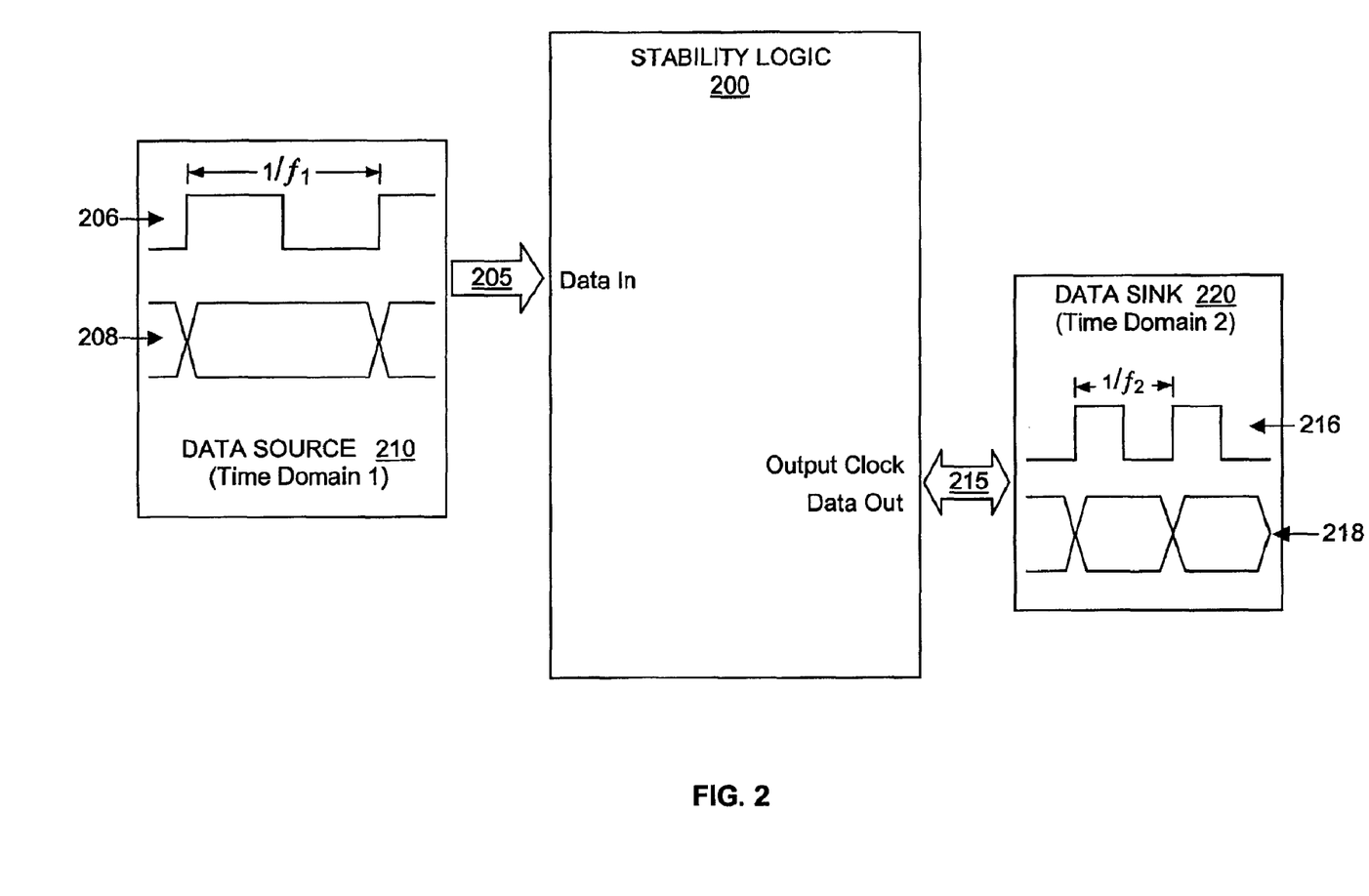
FIG. 2 is a block diagram illustrating an overview of the present invention.

FIG. 2 is a block diagram illustrating an overview of the present invention. As shown, stability logic 200 of the present invention is coupled between data source 210 and data sink 220 by way of communication channels 205 and 215, respectively. Data source 210 represents any of a wide variety of digital computing devices and/or components to supply data and timing signals associated with a first time domain to stability logic 200. In contrast, data sink 220 represents any of a wide variety of digital computing devices and/or components to receive or consume data from stability logic 200 based upon a provided timing signal associated with a second time domain. Communication channels 205 and 215 each represent any of a wide variety of signaling transports to transmit data and timing signals between stability logic 200, and either data source 210 or data sink 220, respectively.

For example, in one embodiment, data source 210 may represent a network interface and data sink 220 may represent a microprocessor, while communication channels 205 and 215 may each represent a multi-bit bus architecture such as a universal serial bus (USB), a peripheral component interconnect (PCI) bus, an industry standard architecture (ISA) bus, and so forth. In an alternative embodiment, data source 210 and data sink 220 may represent independent devices interconnected with stability logic 200 by way of separate wire line and/or wireless network segments, each operating asynchronously with respect to the other. In one embodiment, communication channel 205 represents an Ethernet based network segment, whereas communication channel 215 represents a synchronous optical network (SONET) segment. Although in the illustrated embodiment data source 210, stability logic 200 and data sink 220 are depicted as separate devices and/or components, data source 210 and/or data sink 220 may instead be embodied with the functionality of stability logic 200. In one embodiment, stability logic 200 is implemented as an integrated circuit within data sink 220.

Data source 210 is shown including clock signal 206 having a first frequency ($f_1$), and data signal 208 having been sampled by clock signal 206. Data signal 208 illustrates valid data segments as well as data transition points that correspond to the rising edges of clock signal 206. Each transition point indicates a point in time, including an amount of time preceding and following each transition (i.e. set up and hold times), when the value of the sampled data may change with the value of the clock. During these transitions, the data is considered to be unpredictable and may possibly be invalid. In contrast, between each transition of the sampling clock (e.g. between each rising clock edge), data signal 208 is considered to be valid.

Data sink 220 is shown including clock signal 216 having a second frequency of ($f_2$) where $f_2 > f_1$. In one embodiment clock signal 216 is the sole operational clock utilized by data sink 220, whereas in another embodiment, clock signal 216 is one of multiple clock signals generated and/or provided by data sink 220. In one embodiment of the present invention, stability logic 200 causes data (e.g. data signal 208) associated with a first time domain (e.g. clock signal 206) to be sampled with respect to a second time domain (e.g. clock signal 216) such that the transition of the sampling clock signal does not coincide with a data transition point, thereby avoiding stability concerns, associated with the prior art. For example, in the illustrated embodiment stability logic 200 aligns and samples data signal 208 based upon output clock 216 such that any given transition (e.g. rising edge) of clock signal 216 causes valid data to be sampled.

Figure 3:
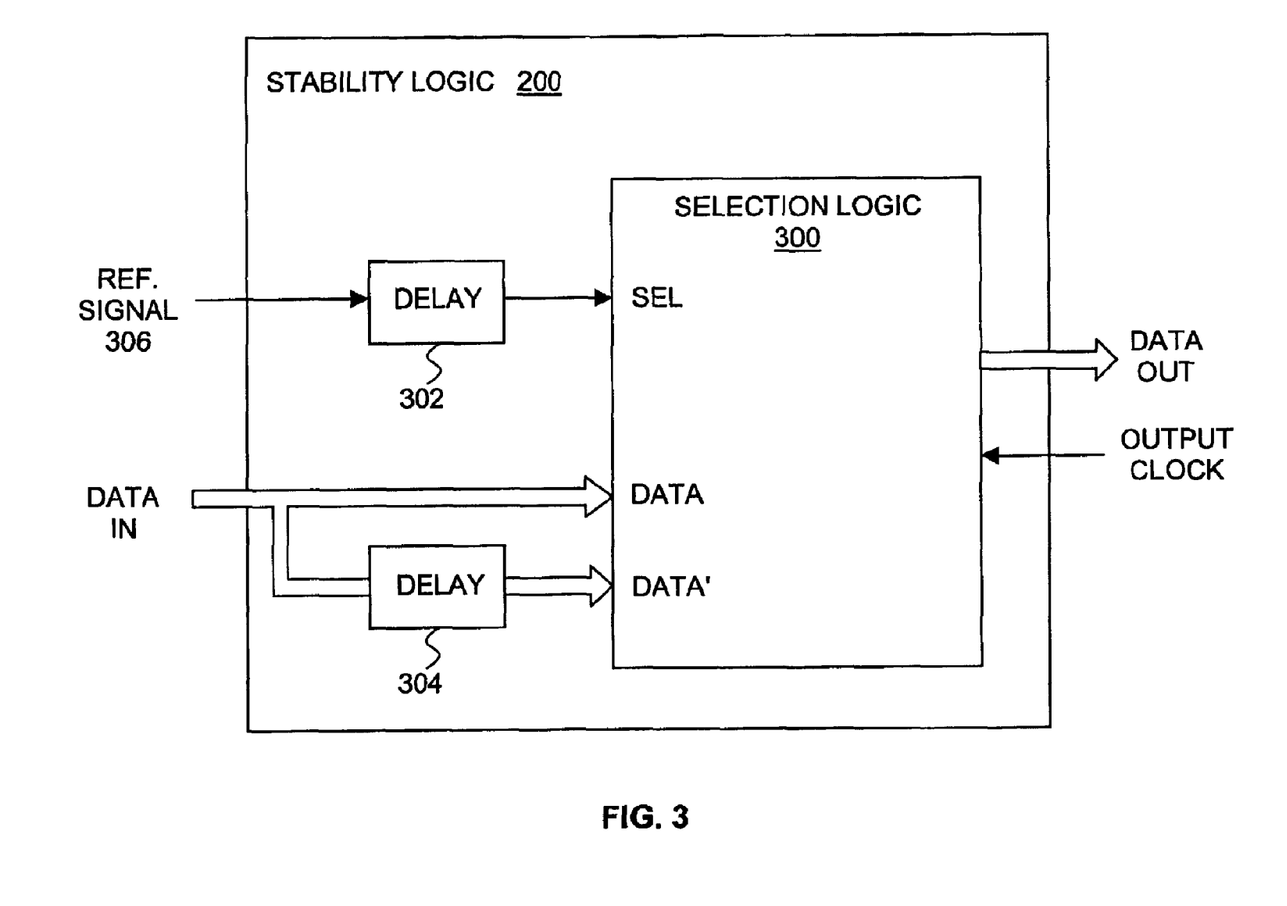
FIG. 3 illustrates a more detailed view of stability logic 200 in accordance with one embodiment of the invention.

FIG. 3 illustrates a more detailed view of stability logic 200 in accordance with one embodiment of the invention. As shown in the illustrated embodiment, stability logic 200 includes delay circuit 302, delay circuit 304, and selection logic 300. Delay circuits 302 and 304 represent readily available analog and/or digital circuitry configured to output a phase-shifted version of a supplied input signal. For example, in the case of an application specific integrated circuit (ASIC) one or more inverters may be used to impart a delay on an input signal, whereas in a larger circuit board design, signal traces having increased lengths may be used to impart a delay on an input signal. In one embodiment, delay circuit 302 is equipped to receive an input reference signal 306 having e.g. a frequency of f and a reference phase of $\phi_1$, and equipped to generate an output signal (SEL) having a shifted phase of $\phi_1 \pm N$ degrees for use as input into selection logic 300. Similarly, delay circuit 304 is equipped to receive a multi-bit (and by inference, a single bit) data signal having a reference phase of +2 and to generate an output data signal (DATA') having a shifted phase of $\phi_2 \pm 2N$ degrees. In one embodiment, delay circuit 302 generates an output signal that is approximately ninety degrees out of phase (i.e. $N \cong 90$) measured with respect to reference signal 306, and delay circuit 304 generates an output data signal that is approximately 180 degrees out of phase (i.e. $2N \cong 180$) measured with respect to the input data signal (see e.g. FIG. 4). Although the illustrated embodiment depicts two separate delay circuits (302 and 304), the present invention may likewise be practiced with a fewer or greater number of delay circuits.

Selection logic 300 is equipped to receive the above-referenced output signal (SEL) from delay circuit 302, the input data signal (DATA), and the output data signal from delay circuit 304 (DATA'). Additionally, selection logic is equipped to receive an output clock signal that is asynchronous with respect to reference signal 306. In accordance with the teachings of the present invention, selection logic 300 samples both DATA and DATA' based on the output clock and selects one of the data lines such that during each transition of the output clock, valid data is present on the selected data line. In one embodiment, selection logic 300 selects between data lines (DATA, DATA') based at least in part upon the output of delay circuit 302 (SEL).

Figure 4:
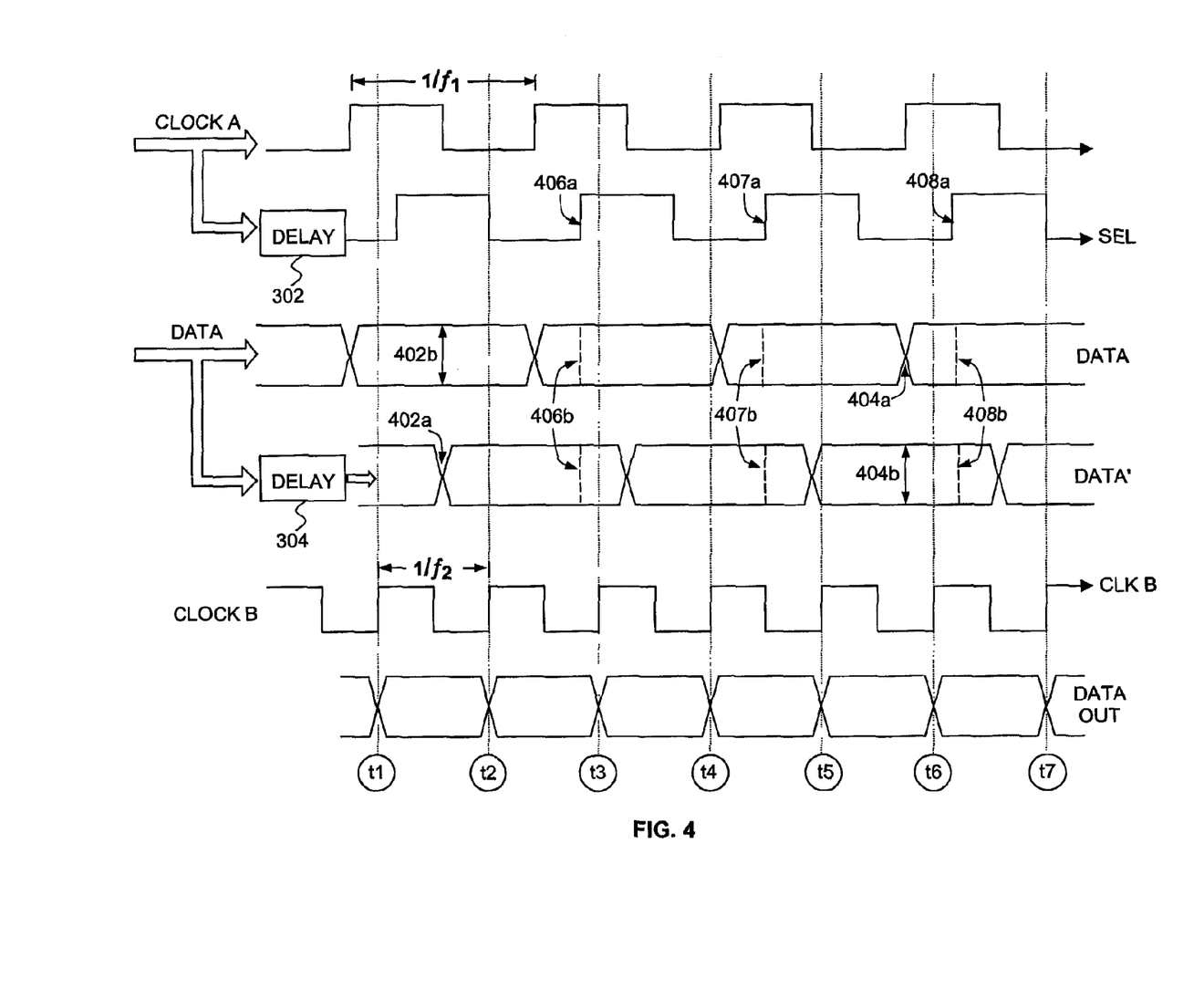
FIG. 4 is a timing diagram illustrating phase relationships between various input signals of selection logic 300, in accordance with one embodiment.

FIG. 4 is a timing diagram illustrating phase relationships between various input signals of selection logic 300, in accordance with one embodiment. In the illustrated embodiment, reference signal 306 is represented by a first clock signal (CLOCK A) associated with a first time domain of frequency $f_1$. As described above, delay circuit 302 utilizes a phase-shifted version of CLOCK A to generate the SEL signal. In one embodiment, delay circuit 302 generates an output signal that is phase shifted by up to 90 degrees measured with respect to CLOCK A. FIG. 4 additionally illustrates an input data signal (DATA) and its relationship to CLOCK A. The input data signal transitions at intervals corresponding to the transitioning of CLOCK A as shown. In the illustrated embodiment, sampling of the input data is triggered on the rising edge of CLOCK A, however, the input data sampling may also be negative edge triggered and level sensitive for example. Accordingly, the input data is valid for a period roughly equivalent to $1/f_1$ of CLOCK A, depending e.g. upon the set-up and hold times of the sampling circuitry (to be further described below). In the illustrated embodiment, the input data signal is further routed through delay circuit 304 to generate a phase-shifted version of the data identified e.g. in FIG. 4 as DATA'. In one embodiment, delay circuit 304 generates an output signal that is phase-shifted by up to 180 degrees measured with respect to the input data signal (DATA). Thus, in accordance with one embodiment of the invention, the DATA and DATA' signals are phase shifted such that at any given transition of DATA' (e.g. 402a), the DATA signal will be valid (e.g. 402b), and at any given transition of DATA (e.g. 404a), the DATA' signal will be valid (e.g. 404b).

FIG. 4 also includes an output clock signal (CLOCK B) associated with a second time domain of frequency $f_2$. In accordance with the teachings of the present invention, one of the input data signal (DATA) and the phase-shifted version of the input data signal (DATA') is selected such that at any given transition of CLOCK B, valid data is selected (i.e. to generate DATA OUT). In one embodiment, CLOCK B selects one of the DATA and DATA' signals based upon the state of the SEL signal. Due to the novel relationship between the SEL, DATA and DATA' signals of the present invention, valid data may be obtained even when SEL is transitioning. That is, these signals are phase shifted such that whenever SEL is transitioning, both DATA and DATA' signals will be valid regardless of which one is selected. For example, at each of transition points 406a–408a of SEL, it can be seen that both DATA and DATA' represent valid data values (406b–408b). In one embodiment, each of the DATA and DATA' signals are alternatingly selected such that CLOCK B does not select the same data (i.e. DATA, DATA') signal two or more consecutive times (to be described more fully below with respect to FIG. 6).

Figure 5:
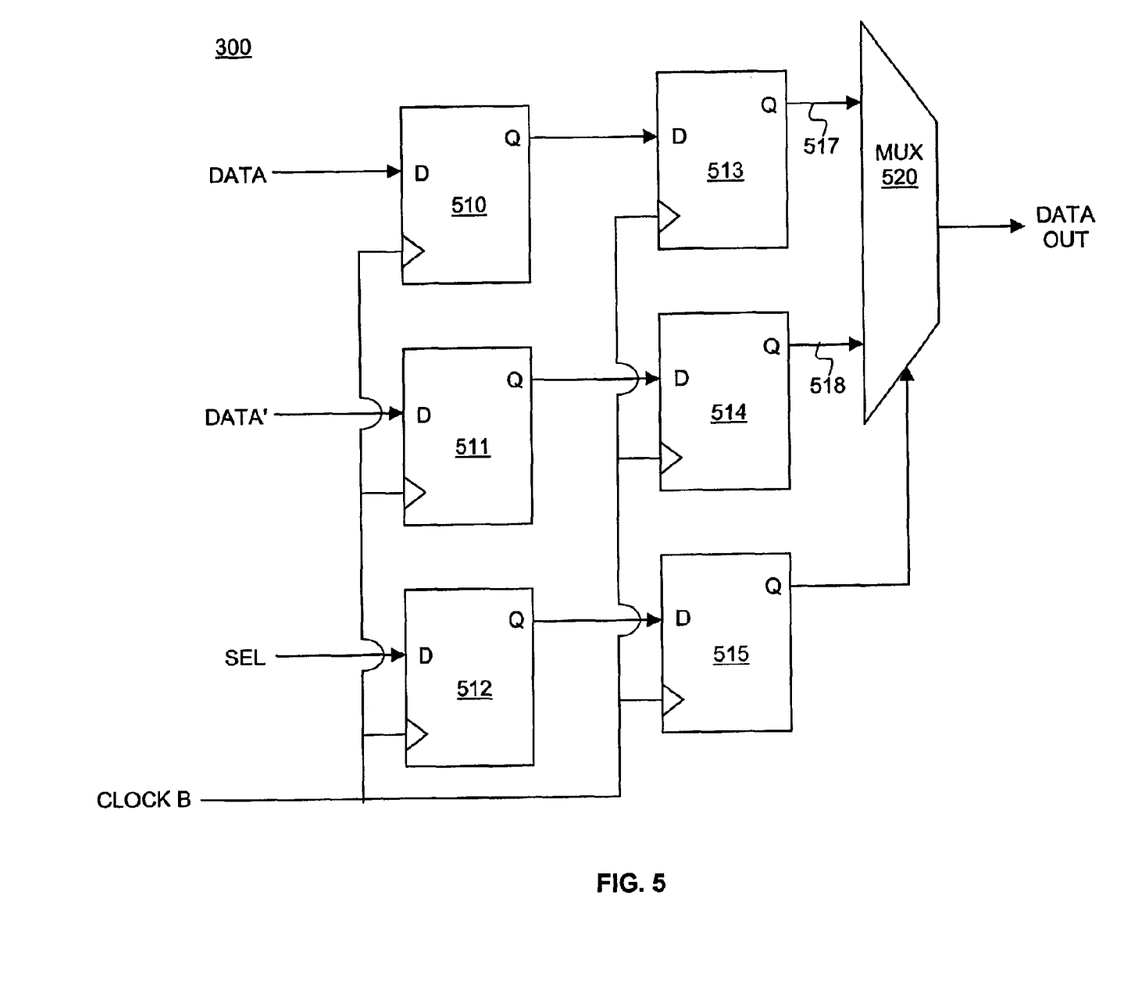
FIG. 5 illustrates a detailed view of one embodiment of selection logic 300.

FIG. 5 illustrates a detailed view of one embodiment of selection logic 300. Selection logic 300 includes registers 510–515 and multiplexer (MUX) 520 coupled together as shown. Register 510 receives the DATA signal, whereas register 511 receives the DATA' signal, and register 512 receives the SEL signal (e.g. from FIGS. 3 and 4). Each of registers 510–515 sample these input signals based upon input from CLOCK B. That is, each of registers 510–515 sample the input data signals (e.g. DATA, DATA') and the SEL signal based upon a clock signal that is asynchronous to the one or more clock signals used to generate the input signals. Once the input signals have been registered, at least a subset of the input signals are passed to MUX 520. For example, in the illustrated embodiment, resampled versions of DATA (517) and DATA' (518) are passed to MUX 520. In one embodiment, MUX 520 selects one of resampled input signals 517 and 518 to pass as output data from e.g. stability logic 200 based upon the state of the SEL signal.

In the illustrated embodiment, registers 510–515 are implemented as edge triggered D flip-flops, however, in other embodiments, registers 510–515 may be implemented through various other types of flip-flops and/or latches known in the art. Together, registers 510–515 operate to further reduce potential metastability concerns with stability logic 300 by providing an additional stage of resolution before being propagated to MUX 520.

Figure 6:
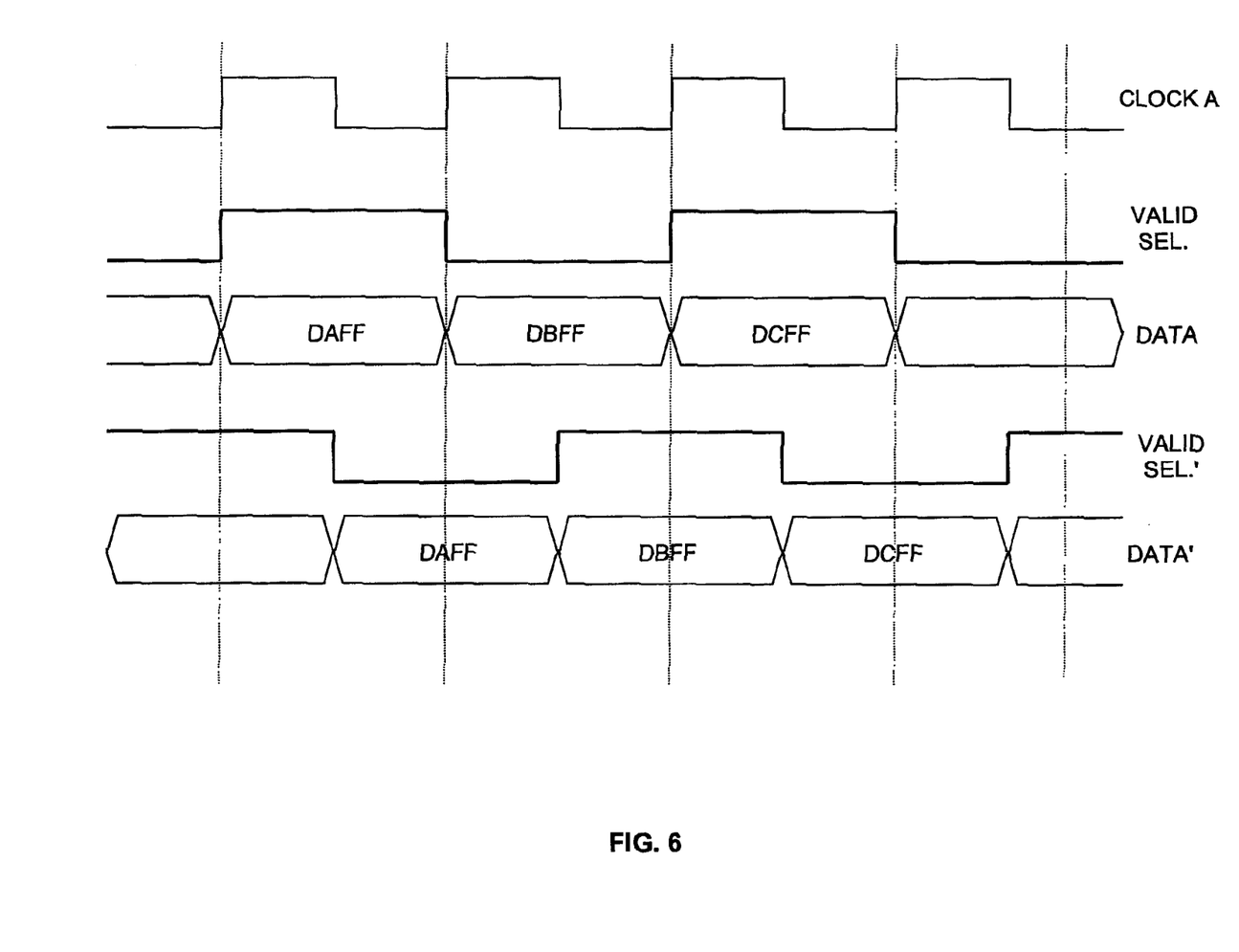
FIG. 6 is a timing diagram illustrating an additional bus signal to be used for identifying duplicative output data.

As was mentioned above, the novel relationship between the SEL, DATA and DATA' signals, facilitates the selection of valid data from one of DATA and DATA' regardless of whether SEL is transitioning or is stable. Although the data that is actually selected in accordance with the present invention will be valid, there is a chance that the same data may be selected two or more consecutive times due to the phase lag (or lead) of DATA'. In one embodiment of the invention, an extra signal (VALID SELECT) is added to e.g. the data bus that echoes the input clock (CLOCK A) at half the frequency of the clock. Depending upon the frequency difference between the clocks, VALID SELECT may be a single-bit or multi-bit signal. FIG. 6 is a timing diagram illustrating such a valid select signal and its relationship to CLOCK A.

Figure 7:
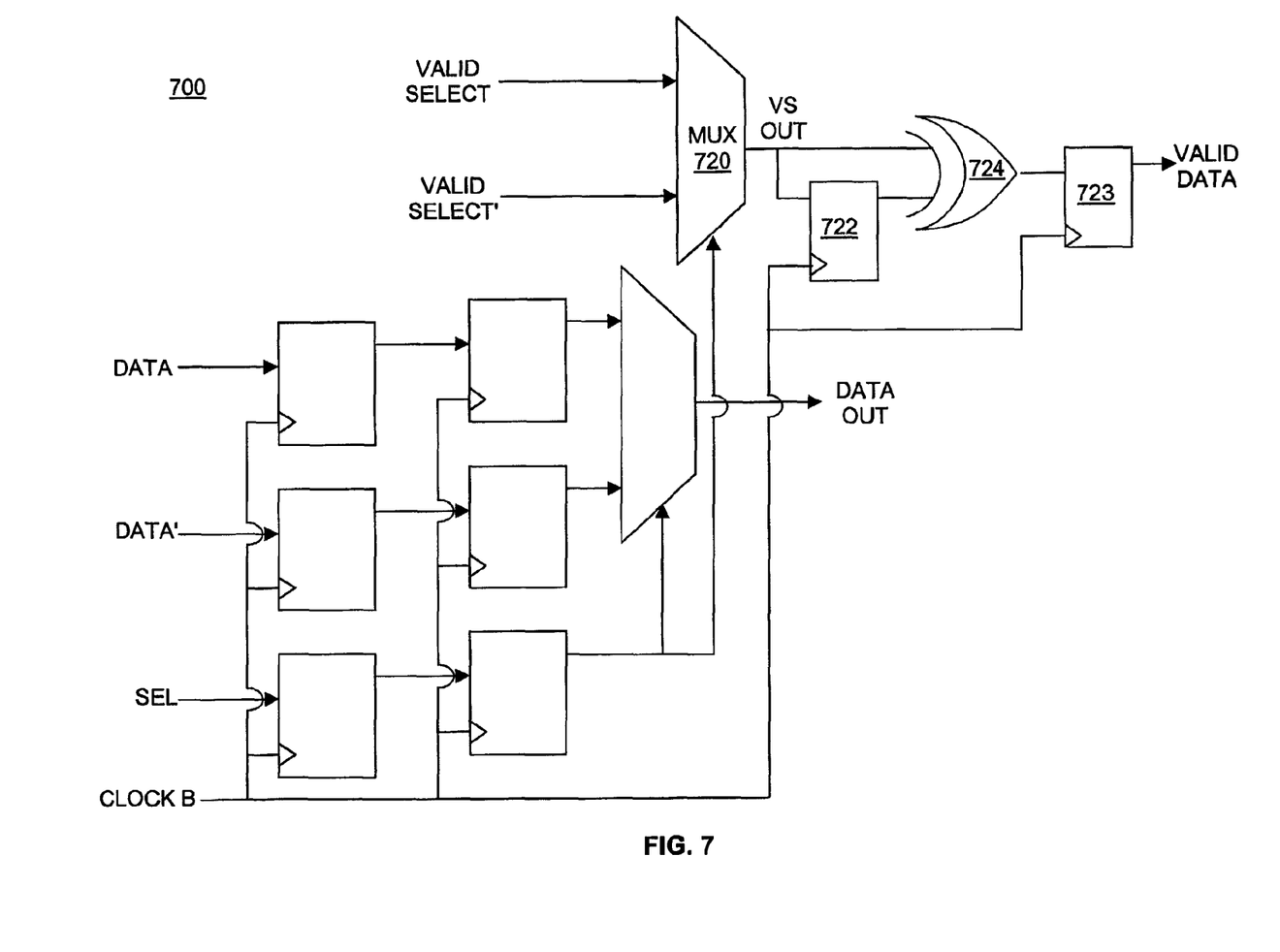
FIG. 7 illustrates an alternative embodiment of the selection logic of the present invention including additional valid data selection logic.

FIG. 7 illustrates an alternative embodiment of the selection logic of the present invention including additional valid data selection logic. As shown, selection logic 700 includes all the elements of FIG. 5 as described above, in addition to new logic elements coupled together as shown. MUX 720 represents a data selector to select between the VALID SELECT and VALID SELECT' input signals based upon the state of the SEL signal. Thus, if MUX 520 selects the DATA input signal to pass through as output data, MUX 720 will select the corresponding VALID SELECT signal to pass through as VS OUT. Conversely, if MUX 520 selects the DATA' input signal, MUX 720 will select the corresponding VALID SELECT' signal to pass through as VS OUT. VS OUT is then used as an input signal into XOR gate 724 and register 722. The output of register 722 is fed into XOR gate 724, which ultimately supplies an input signal for register 723. Both registers 722–723 (along with the remaining registers) are commonly triggered by CLOCK B. Such a novel configuration for the selection logic of the present invention facilitates the output of a VALID DATA signal which, when used in conjunction with DATA OUT, will indicate to down-line logic blocks whether duplicative data has been selected.

Conclusion and Epilogue

Thus, ft can be seen from the above descriptions, a novel method and apparatus for passing data across an asynchronous clock boundary has been described. While the present invention has been described in terms of the above-described embodiments, the present invention is not limited to the embodiments described. As the present invention can be practiced with further modification and alteration within the spirit and scope of the appended claims, the description is to be regarded as illustrative instead of restrictive on the present invention.

What is claimed is:

1. A method comprising:
   receiving a first data signal generated with respect to a first clock signal associated with a first time domain;
   receiving a second data signal representing said first data signal delayed by a first measure such that during transition of said first data signal said second data signal is valid, and during transition of said second data signal said first data signal is valid;
   receiving a selector signal to select between said first and said second data signals, said selector signal representing said first clock signal delayed by a second measure such that at any given sampling point of said selector signal said selector signal will select valid data;
   receiving a second clock signal associated with a second time domain; and
   sampling said selector signal and said first and second data signals based at least in part upon said second dock signal to output the selected one of said first and second data signals with respect to said second time domain.

2. The method of claim 1, wherein said second measure is half of said first measure.

3. The method of claim 2, wherein said second data signal is delayed an amount sufficient to cause said second data signal to be approximately 180 degrees out of phase with respect to said first data signal and said selector signal is delayed an amount sufficient to cause said selector signal to be approximately 90 degrees out of phase with respect to said first clock signal.

4. The method of claim 1, wherein said first time domain is asynchronous to said second time domain.

5. The method of claim 1, wherein said selector signal alternatingly selects between said first and second data signals.

6. The method of claim 5, wherein said selector signal is in a first signal state while said first data signal is valid and said selector signal is in a second signal state while said second data signal is valid.

7. The method of claim 5, wherein said second clock signal has a frequency that is approximately double that of the first clock signal.

8. The method of claim 1, wherein said data signal is generated by a multi-bit data bus.

9. A method of passing data between a first time domain and a second asynchronous time domain, the method comprising:
   receiving a first data signal generated with respect to a reference signal associated with said first time domain, said reference signal having a period of N;
   receiving a second data signal, said second data signal being phase-shifted by a factor of N/2 with respect to said first data signal;
   receiving a third signal, said third data signal being phase-shifted by a factor of N/4 with respect to said reference signal;
   sampling said first data signal, said second data signal and said third signal based at least in part upon a clock signal of said second time domain; and selecting between said first and second data signals based at least in part upon said third signal to output valid data independent of said first and second data signal states at the time of sampling.

10. The method of claim 9, wherein said second signal is approximately 180 degrees out of phase with respect to said first data signal and said third data signal is approximately 90 degrees out of phase with respect to said reference signal.

11. The method of claim 9, wherein said data signal is generated by a multi-bit data bus.

12. A method of passing data between a first time domain and a second asynchronous time domain, the method comprising:

receiving a first data signal generated with respect to a first clock signal associated with said first time domain;

receiving a second data signal representing said first data signal delayed by a first measure such that during transition of said first data signal said second data signal is valid, and during transition of said second data signal said first data signal is valid;

receiving a selector signal representing said first clock signal delayed by a second measure; and selecting between said first and second data signals based at least in part upon a first state of a second clock signal associated with said second time domain and a second state of the selector signal.

13. The method of claim 12, wherein the second measure is such that at any given sampling point of said selector signal said selector signal will select valid data.

14. The method of claim 13, wherein said selecting comprises sampling said selector signal based upon the value of said second clock signal to output the selected one of said first and second data signals.

15. The method of claim 13, wherein said second data signal is delayed an amount of time sufficient to cause said second data signal to be approximately 180 degrees out of phase with respect to said first data signal and said selector signal is delayed an amount of time sufficient to cause said selector signal to be approximately 90 degrees out of phase with respect to said first clock signal.

16. The method of claim 12, wherein said data signal is generated by a multi-bit data bus.

17. A method comprising:

receiving a first data signal generated with respect to a first clock signal associated with a first time domain;

generating a second data signal based at least in part upon said first data signal, said second data signal being out of phase with respect to said first data signal by a first measure such that during transition of said first data signal said second data signal is valid, and during transition of said second data signal said first data signal is valid;

generating a selector signal such that at any given sampling point of said selector signal said selector signal will indicate a valid one of said first and second data signals;

receiving a second clock signal associated with a second time domain; and sampling said selector signal said first and second data signals based at least in part upon said second clock signal to output a selected one of said first or second data signals with respect to said second time domain.

18. The method of claim 17, wherein generating said selector signal comprises a delayed version of said first clock signal.

19. The method of claim 18, wherein said second data signal is approximately 180 degrees out of phase with respect to said first data signal and said selector signal is delayed an amount sufficient to cause said third signal to be approximately 90 degrees out of phase with respect to said first clock signal.

20. An integrated circuit comprising:

a first delay circuit to generate a selector signal based at least in part upon an input reference signal of a first time domain;

a second delay circuit to generate a delayed data signal based at least in part upon an input data signal; and selection logic coupled to the first and second delay circuits to select between said input data signal and said delayed data signal based at least in part upon a state of the selector signal in accordance with an input clock signal of a second time domain, such that at any given sampling point of the input clock signal, the selector signal indicates valid data.

21. The apparatus of claim 20, wherein the first delay circuit causes the selector signal to be approximately ninety degrees out of phase with the input reference signal.

22. The apparatus of claim 21, wherein the second delay circuit causes the delayed data signal to be approximately 180 degrees out of phase with the input data signal.

23. The apparatus of claim 20, wherein the selection logic further comprise s:

at least two edge triggered flip-flops to latch the input data signal and the delayed data signal based at least in part upon the input clock signal; and a multiplexer to select between one of said input data signal and said delayed data signal based at least in part upon the state of the selector signal.

24. An apparatus comprising:

first logic to:

receive a first data signal generated with respect to a first clock signal associated with said first time domain, receive a second data signal representing said first data signal delayed by a first measure such that during transition of said first data signal said second data signal is valid, and during transition of said second data signal said first data signal is valid; and receive a selector signal representing said first clock signal delayed by a second measure such that any given sampling point of said selector signal will indicate valid data, and receive a second clock signal associated with said second time domain to sample said first data signal, said second data signal, and said selector signal; and second logic coupled to said first logic to select between said first and second data signals based at least in part upon a sampled value of said selector signal.

25. The apparatus of claim 24, further comprising:

a first delay circuit to generate said second data signal based at least in part upon said first data signal; and a second delay circuit to generate said selector signal based at least in part up on said first clock signal.

26. The apparatus of claim 25, wherein said first delay circuit delays said first data signal such that said second data signal is approximately 180 degrees out of phase measure with respect to said first data signal.

27. The apparatus of claim 25, wherein said delay second delay circuit delays said first clock signal such that said selector signal is approximately 90 degrees out of phase measure with respect to said first clock signal.

* * * * *